G. H. WHITTINGHAM.
CONTROLLER FOR ELECTRIC MOTORS.
APPLICATION FILED DEC. 3, 1914.
1,241,180.
Patented Sept. 25, 1917.
2 SHEETS—SHEET 1.
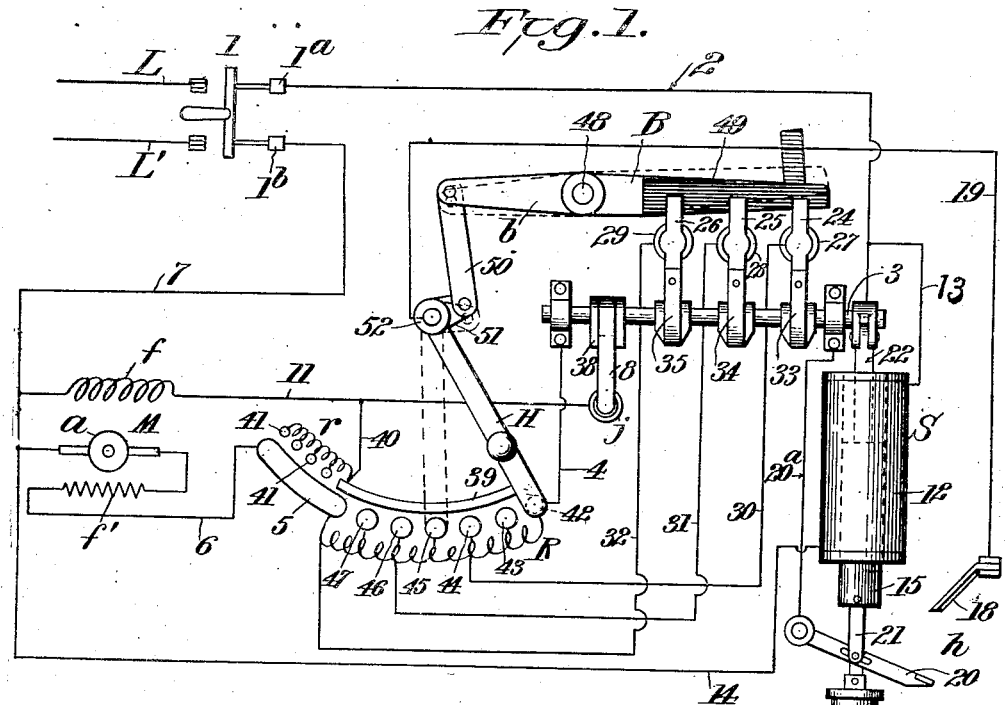
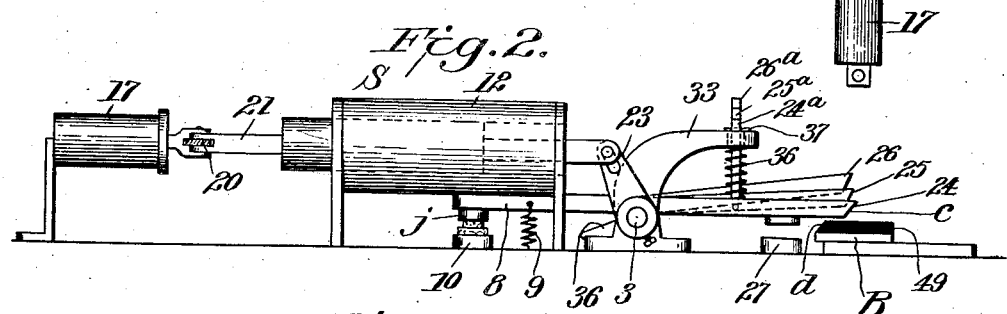
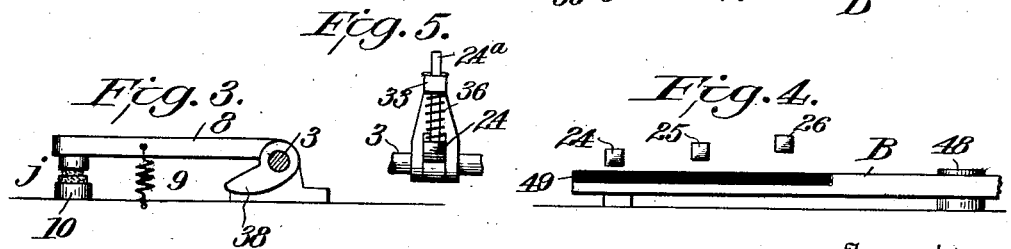
Witnesses
Inventor
G. H. Whittingham
By Watson & Boyden
Attorneys

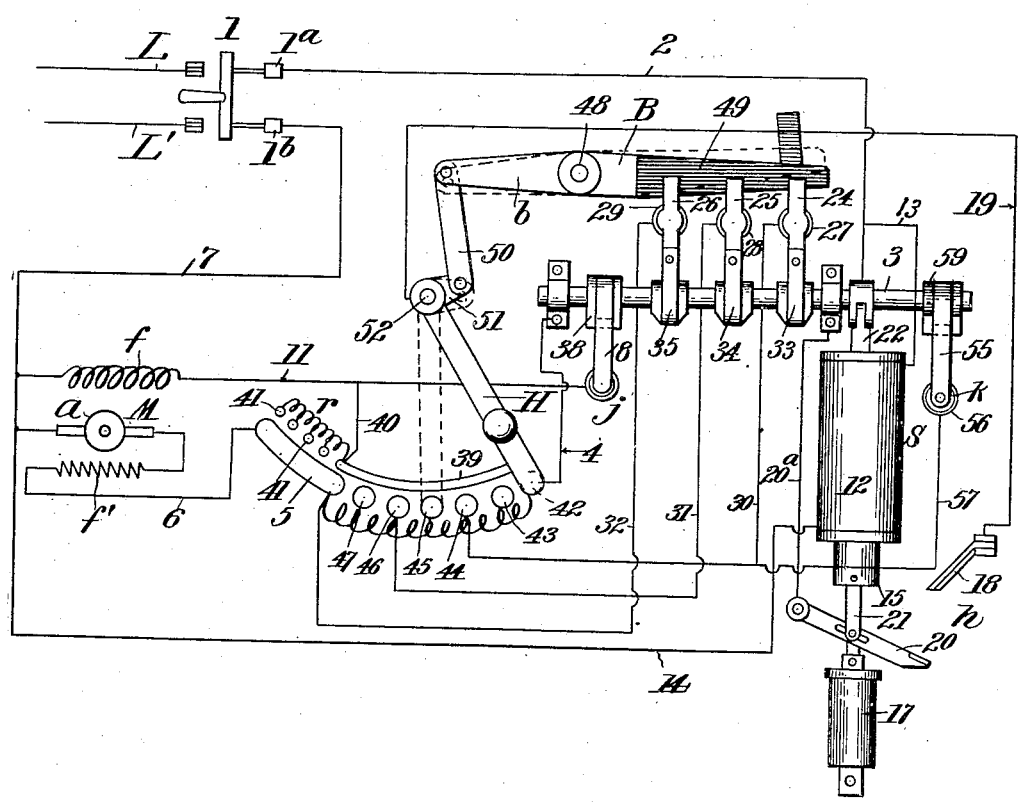

UNITED STATES PATENT OFFICE.

GEORGE H. WHITTINGHAM, OF PIKESVILLE, MARYLAND, ASSIGNOR TO MONITOR CONTROLLER COMPANY, OF BALTIMORE, MARYLAND, A CORPORATION OF MARYLAND.

CONTROLLER FOR ELECTRIC MOTORS.

1,241,180.  Specification of Letters Patent.  Patented Sept. 25, 1917.

Application filed December 3, 1914. Serial No. 875,318.

*To all whom it may concern:*

Be it known, that I, GEORGE H. WHITTINGHAM, a citizen of the United States, residing at Pikesville, in the county of Baltimore and State of Maryland, have invented certain new and useful Improvements in Controllers for Electric Motors, of which the following is a specification.

This invention relates to automatic starting and speed controlling apparatus for electric motors, combined and arranged so that the speed controlling means may be set for any given running speed, and the motor may then be stopped and started as often as desired by means of the automatic starter, and after each starting operation the motor will run at the pre-set running speed without requiring adjustment of the speed controlling device. In O'Brien Patent No. 891,720, and in my prior Patent No. 965,673, are shown mechanisms for accomplishing similar functions, and the advantages of such arrangements of combined hand regulating and automatic starting devices for controlling motors operating individual machines, such as printing presses, are therein set forth. The mechanism of the present invention comprises a starter for automatically cutting resistance out of the armature circuit of the motor, when the current is turned on, a hand regulator for controlling the running speed of the motor, and connections between the hand regulator and the starter for regulating the amount of resistance which the latter may cut out during the starting operation.

In the embodiment of the invention illustrated in the drawings, the starter is provided with a series of independently movable contact fingers, electro-magnetically operated means for yieldingly pressing these fingers toward stationary contacts connected with the armature resistance, a manually adjustable lever also engaging contacts on the resistance, and means connected with the lever for arresting the closing movements of all or any of the contact fingers of the starter, according to the pre-set position of the lever, the arrangement being such that when the manually controlled member is set to give the slowest armature speed, the starter will be inoperative, while, when said member is set for normal speed, the starter will operate in the usual way to start the motor, and in intermediate positions of said member, the starter will be more or less operative. Also, the manually controlled member may be set for a running speed above the normal, in which position the starter will perform the usual function of cutting all of the resistance out of the armature circuit.

A torque switch is associated with the starter for admitting an abnormally large current to the motor armature for a short interval of time prior to the operation of the starter, where the load to be started has so much inertia or frictional resistance that the motor cannot start it promptly, or at all, with the normal starting current admitted through all of the armature resistance, although the motor may easily drive the load, after it has been moved, with the hand controller set to include all or any part of the resistance in said circuit.

In the accompanying drawing which illustrates the invention,

Figure 1 is a front elevation of the controller and a diagrammatic view of the circuits;

Fig. 2 is a side elevation of the controller, looking from right to left in Fig. 1;

Fig. 3 is a detail showing the switch for inserting and cutting out the field resistance;

Fig. 4 is a view looking from right to left in Fig. 2, showing the contact fingers of the starter and the barrier or interposing device;

Fig. 5 is a detail view showing a portion of the rock shaft of the starter with one of the contact fingers and the arm for operating said finger mounted thereon;

Fig. 6 is a front elevation of the controller and diagram of the circuits, the same as Fig. 1, but with a torque switch attached; and, Fig. 7 is a side view of the torque switch.

Referring to Figs. 1-5, inclusive, of the drawing, 1 indicates a switch for connecting the motor and the controlling apparatus with the supply circuit L, L', and M indicates the motor to be controlled comprising the armature $a$, a shunt field winding $f$, and the motor may also have a series field winding $f'$. R indicates a resistance in the armature circuit, and $r$ indicates a resistance for the shunt field circuit. A regulator arm H is adjustable over the contacts of the resistances and adapted, by the means hereinafter described, to include more or less of the armature resistance, or, more or less of the field resistance, as desired, for the purpose of regulating the running speed of the motor. A starter S is provided for cutting out the starting resistance, and this starter, after it has performed its function of operating to cut out the starting resistance, includes the hand controlled lever H in the armature and field circuits so that the speed of the motor, after starting operation, depends upon the position of the manually controlled member H.

The circuit through the armature, when the parts are in normal positions with the supply circuit switch 1 open, is from the terminal 1ª of said switch through conductor 2, to a shaft 3, which forms part of the starter, thence through conductor 4 to one end of the resistance R, thence to segment 5, thence by conductor 6 to series field f', thence through the armature and by conductor 7 to the supply switch terminal 1ᵇ. Upon the closure of the switch 1, therefore, current will immediately flow through all of the armature resistance and through the armature, as well as the series field if such is employed. The shunt field circuit proceeds from the conductor 2 and shaft 3, through an arm 8 on said shaft, which is normally closed by a spring 9 against a stationary contact 10, thence through conductor 11 to the shunt field winding, and thence through conductor 7 to the terminal 1ᵇ of the supply switch. Upon the closure of the supply switch, therefore, the shunt field will be fully energized by the current flowing through the circuit just traced.

The starter comprises a solenoid 12, the coils of which are connected by conductor 13 to conductor 2, and by conductor 14 to conductor 7, so that its solenoid will also be energized immediately upon the closure of the supply switch 1. The upward movement of the solenoid core 15 is retarded by a dash pot 17. This core moves through a fixed distance each time it operates, and approximately at its upward limit of movement causes the closure of a switch h, which connects the manually controlled lever H to the supply circuit. As shown, this switch comprises a stationary contact 18, connected by conductor 19 to the lever H, and a movable contact arm 20, which is mechanically connected to the solenoid core by a link 21. The switch arm 20 is connected by conductor 20ª to the shaft 3, and thence by conductor 2 to the terminal 1ª of the supply switch. When the solenoid is energized, the switch arm 20 slowly moves to closed position, and when the solenoid is deënergized, its core drops and quickly opens the switch h. The starter, in addition to the solenoid and dash pot, includes certain features similar to those found in O'Brien Patent No. 860,104, to-wit: a series of independently movable contact fingers, means for yieldingly pressing these fingers toward stationary contacts, and a barrier or interposing device for preventing the closure of these contacts, which barrier in the O'Brien patent is movable out of the path of the fingers by a solenoid, while in the present invention, the barrier is adjustable into and out of the path of the fingers by means of the regulator arm which controls the running resistance of the motor circuits. In the drawing, a non-magnetic rod 22, projecting upwardly from the solenoid core, is pivotally connected to a crank 23 secured to the shaft 3, so as to cause the shaft to rock with the movements of the core. Upon this shaft are loosely mounted the contact fingers 24, 25, and 26, which are adapted to engage, respectively, the sttionary contacts 27, 28, and 29, connected by leads 30, 31, and 32, to successive points in the armature resistance R. Upon the shaft are rigidly secured arms 33, 34, and 35, which project over the contact fingers 24, 25, and 26, respectively, and the latter are connected to the rigid arms by pins 24ª, 25ª, and 26ª, which project loosely through openings in said arms. Springs 36 surround the pins and are interposed between the rigid arms and the contact fingers so that when the arms are rocked, the fingers will be pressed yieldingly toward the stationary contacts. The contact fingers are held in staggered relation with respect to the stationary contacts by suitable means, such as cotter pins 37 (Fig. 2), which pass through the pins 24ª, 25ª, etc. at different distances from the contact fingers. The arm 8 of the field switch j is also loosely mounted upon the rock shaft 3, and a cam 38, rigidly secured to said shaft, is adapted to open this switch, against the action of the spring 9, after the switch h has been closed by the upward movement of the solenoid. Upon the closure of the switch h, which causes the regulator arm H to be connected to the supply circuit through conductors 2, 20ª, switch h, and conductor 19, a new path is formed to the shunt field by way of said arm, a segment 39 on the rheostat and a conductor 40 connecting said segment with the conductor 11; hence, the field circuit will be completed through the regulator arm H before the field switch j is opened. If the regulator arm H should, at this time, be resting upon any of the contacts 41 of the field resistance r, the current will flow from said arm through the resistance included between it and the segment 39 to which the resistance is connected. In the same way, if the arm H rests upon any of the contacts 42 to 47 of the resistance R, the current to the armature will flow through that portion of the resistance included between said arm and the contact segment 5. The field and armature resistances are arranged so that the hand regulator arm will not engage the field resistance contacts unless it is in position to cut out or exclude all of the armature resistance.

A barrier or interposing device B is arranged so that it may be moved under the ends of the contact fingers of the starter to prevent their engagement with the stationary contacts, or swung out of the way so as to permit all of said fingers to engage said contacts, or adjusted so as to permit any desired number of the fingers to engage the contacts when pressed toward them by the operation of the solenoid. This barrier is shown in the form of a lever, centrally pivoted at 48, and having a layer of insulation 49 upon its longer arm which moves in a plane beneath the contact fingers. The shorter arm b of the barrier is connected by a link 50 to an arm or crank 51 projecting from the lever H near its pivotal point 52. The arrangement of the parts just mentioned is such that when the manually controlled lever H is set upon the first contact 42 of the armature resistance, the barrier will prevent the closure of the contact fingers of the starter, without, however, preventing the continued upward movement of the solenoid core, because of the resilient connections 36 between the rocker arms 33 and the contact fingers, so that the solenoid may cause the closure of the switch h, notwithstanding all of the contact fingers are prevented from engaging the armature resistance contacts. If the lever H is set upon the contact 44 of the rheostat, the barrier will be adjusted so as to permit the first contact finger of the starter to close, upon the operation of the solenoid, but to prevent the closure of the remaining fingers 25 and 26. If the manual lever H is set on the contact 46, the barrier will obstruct the closure of the contact finger 26, but will permit the fingers 24 and 25 to close, and if the lever H is set at any point upon the elongated contact 5, the barrier will be removed from the paths of all of the fingers so that the starter may operate in the usual way to slowly cut out the starting resistance.

In operation, assuming the parts to be in the position shown in full lines in Fig. 1, upon the closure of the line switch 1, current will pass to the armature through the conductor 2, shaft 3, conductor 4, and all of the resistance R; at the same time, the shunt field f will receive current of full strength through conductor 2, shaft 3, field switch j, and conductor 11, and the motor will start with full resistance in the armature, and no resistance in the shunt field. Simultaneously with the closure of the line switch, the solenoid will be energized and its core will be gradually lifted, retarded by the dash pot, and the contact fingers of the starter will be pressed against the barrier without engaging any of the stationary contacts. Hence, the starter will not cut out any of the resistance R. The continued upward movement of the solenoid core finally closes the switch h and thereby connects the manual lever H to the line, and current thereafter flows to the armature through said lever and the entire resistance R, causing the motor to run at its slowest speed. Immediately after the closure of the switch h, the field switch j opens, and the shunt field winding then receives current through the arm regulator H.

Assuming now that the lever H is set on the contact 44, before the line switch is closed. This will adjust the barrier so as to carry it out of the path of movement of the contact finger 24, but it will still obstruct the closing movements of the fingers 25 and 26. Then, upon the closure of the line switch, the armature will at first receive current through conductor 2, shaft 3, conductor 4, and all of the resistance R, and the shunt field will receive its full current through conductor 2, shaft 3, switch j, and conductor 11. As the solenoid lifts its core, the contact finger 24 will be pressed into engagement with the stationary contact 27, and the sections of resistance between the contacts 44 and 42 will thereby be shunted, the current flowing to the armature from conductor 2, through shaft 3, finger 24, contact 27, conductor 30, to contact 44 of the rheostat, thence through the sections of the resistance R between the latter contact and the contact 5, and hence through conductor 6 and the series field to the armature. As the solenoid core continues its upward movement, the switch h will be closed, and the current then will flow through said switch to the lever H and contact 44, upon which it is supposed to rest, thus establishing another shunt around the part of the armature resistance included between the contacts 42 and 44. As the starter fingers 25 and 26 are prevented from operation, it will be evident that the motor will run at a speed determined by the resistance between the contacts 44 and 5. Similarly, if the lever H is set on the contact 46, and the line switch is then closed, the fingers 24 and 25 of the starter will be free to operate and this will cut out first the section of armature resistance to the right of contact 44, and then the section to the right of contact 46, and as the finger 26 will be prevented from operating the section to the left of contact 46, it will remain in circuit with the armature for speed regulating purposes after the motor has started, the current flowing through the switch h and manual lever H, relieving the starter contacts of the duty of carrying the whole current to the armature. Evidently, from what has been before described, if the lever H is pre-set upon the contact 5, but not engaging any of the field resistance contacts, all of the contact fingers of the starter will be free to operate, and after the starter has operated and gradually cut out the resistance R from the armature circuit, the current will flow to the armature, after the closure of the switch $h$, through the lever H and contact 5, and in this running position no resistance will be included in either the armature or the field circuit. If the lever H is set farther to the left, say upon the left hand contact 41 of the field resistance $r$, and the starter is then operated, all of the contact fingers of the starter being free to close, the resistance R in the armature circuit will first be cut out by the starter, the switch $h$ will connect the lever H to the supply circuit, and current will flow directly therethrough to the armature; also when the field switch $j$ opens, after the switch $h$ has closed, the path of current to the field will be through the lever H and all of the field resistance $r$, and through conductors 40 and 11. Hence, after the starter has operated to cut out the armature resistance, the pre-set field resistance will be included in the shunt field circuit. Any desired amount of field resistance may thus be included to cause the operation of the motor at a speed above the normal after the starting operation has been performed.

If the lever H is placed upon a contact point of the armature resistance intermediate the points which are connected to the stationary contacts of the starter, as, for instance, upon the point 45, the resistance retained in circuit with the armature after the starter has operated will be different in amount from that which is cut out by the starter. Thus, it will be noted that while, in the drawing, only three contact fingers are shown on the starter and three stationary contacts on the starter connected to the same number of points on the resistance, there are for speed controlling purposes seven contacts on the resistance R. While the resistance may for starting purposes be cut out in a comparatively few steps, it is desirable for speed regulating purposes to have a number of steps so that the speed adjustment may be varied as desired. Referring now to the dotted position of the lever H and barrier $b$ in Fig. 1, the former is shown as resting upon the contact 45, intermediate the contacts 44 and 46, which are connected to the contacts 27 and 28 of the starter. In this position of the lever H, the barrier obstructs the closure of the fingers 25 and 26, leaving the finger 24 free to close. Hence, upon the operation of the starter the finger 24 will cut out only that part of the armature resistance which is between the contacts 44 and 42, while, when the switch $h$ closes, the current will flow through the lever H directly to contact 45, and thence through the resistance between said contact and the contact 5, cutting out the part of the resistance between the contacts 44 and 45, which part was not cut out by the closure of the starter finger 24. Hence, the motor will operate at a somewhat higher speed than if the lever H had been pre-set upon the contact 44. Similarly, if the lever H were pre-set upon the intermediate contact 43, in which position the barrier would prevent the closure of all of the fingers of the starters, none of the starting resistance would be cut out by the starter, but upon the closure of the switch $h$, current would flow through the lever H to the contact 43, causing the part of the resistance between the contacts 43 and 42 to be cut out. Thus, when the lever H is placed upon the contacts other than those to which the starter fingers are connected, the lever, with its closing switch $h$, serves the function of a starter member to cut out a portion of the resistance which the starter itself does not cut out.

As it may be desirable at times while the motor is running, to reduce or vary its speed, the ends of the contact fingers are beveled, as shown at $c$, and the adjacent edge $d$ of the barrier is likewise beveled so that, notwithstanding the fingers may be pressed into engagement with their respective contacts, the operation of the lever H in the direction to include resistance in the armature circuit will lift the fingers from their contacts, while the movement of said lever in the opposite direction, will release the fingers, the number of fingers thus raised or lowered depending upon the position to which the lever H is adjusted.

It will be evident from the foregoing description that, by means of the apparatus described, the speed control, after the starting operation, will depend entirely upon the position of the manually controlled lever.

Where it is necessary to start loads having considerable inertia, such as large printing presses which require considerable power for prompt starting, the controlling mechanism may be provided with a torque switch, indicated at $k$, in Figs. 6 and 7, for maintaining a portion of the armature resistance short-circuited for a brief interval of time, after the current is turned on, and then opening this short-circuit prior to the time when the starter commences to cut out resistance. In the drawing this torque switch is shown as a contact finger 55, loosely mounted upon the shaft 3, and normally engaging a stationary contact 56. The arm is electrically connected to the side $1^a$ of the supply switch through conductor 2 and shaft 3, and the stationary contact is connected to the contact 44 of the armature resistance by conductors 57 and 30. The arm 55 is normally pressed against the contact 56 by a spring 58. A cam 59, secured to the shaft, is arranged so that it will lift the arm 55 out of engagement with the contact 56, after the solenoid has started to rock the shaft and before the rocking shaft has caused the first contact finger 24 of the starter to engage its contact. For instance, if it requires two seconds for the solenoid to rock the shaft far enough to cause the first contact finger 24 of the starter to engage its contact, the cam 59 might be arranged so as to lift the arm 55 at the expiration of one second. This would allow the current to flow through the shunt circuit 57 to contact 44 of the resistance, cutting out the sections to the right of the latter contact for a second, until the switch *k* opens, when the sections to the right of contact 44 will be again re-inserted, and a short interval thereafter the arm 24 of the starter would close against its contact 27, cutting out the same portions of the resistance, and the other contact fingers of the starter would operate in succession in the usual way to eliminate all of the resistance, providing, of course, the barrier was in position to permit the starter fingers to close. This torque switch is very useful for starting heavy loads, where it is required that the motor shall operate, after starting, at a slow speed, which loads would be difficult to start with all of the resistance initially in the armature circuit.

What I claim is:

1. In an electric motor controlling apparatus, the combination with a resistance for the armature circuit and a device adjustable at will for varying the resistance in said circuit, of an automatic starter for cutting resistance out of said circuit, and a barrier controlled by said device adapted to render the starter more or less inoperative, according to the position of said device.

2. In an electric motor controlling apparatus, a resistance for the armature circuit, an automatic starter for cutting resistance out of said circuit comprising movable contact members and means for moving said members into and out of engagement with the resistance contacts, a manually operable device for regulating the running resistance in the armature circuit, and a barrier adjustable by said device for obstructing the closing movements of more or less of said members according to the position of said device.

3. In an electric motor controlling apparatus, a resistance for the armature circuit, an automatic starter for cutting resistance out of said circuit, said starter comprising a plurality of independently movable contact fingers, each adapted to engage a separate contact of the resistance, and electromagnetically operated means for moving said fingers to engage their respective contacts, a manually controlled device engaging contacts of the resistance for regulating the running speed of the motor, and a barrier movable by said device and adapted to obstruct the closing movements of more or less of said fingers in the slower speed positions of said device and to permit all of said fingers to close in the normal speed position of the device.

4. In a controlling lever for electric motors, a resistance for the armature circuit, a starter for cutting resistance out of the circuit comprising contact members adapted to engage separate contacts of the resistance, an electromagnetic device for moving said members to engage the contacts and yielding connections between said members and device, permitting the device to move after the members have engaged the contacts, a switch adapted to be closed by said device after the members have engaged their contacts, and a manually adjustable member for adjusting the running resistance adapted to be connected to the supply circuit by said switch.

5. In a controlling device for electric motors, a resistance for the armature circuit, an automatic starter for cutting resistance out of said circuit comprising an electromagnetic device having a fixed range of movement, and one or more yieldingly connected contact members movable thereby, a barrier for stopping the movement of the contact member or members while permitting said device to complete its movement, a switch adapted to be closed by said device at or near the completion of its movement, and a manually controlled member for varying the running resistance of the motor adapted to be connected to the supply circuit by said switch.

6. In a controlling apparatus for electric motors, resistances for the armature and shunt field circuits, a member adjustable at will for varying the running resistances in said circuits, an automatic starter for cutting resistance out of the armature circuit, and means adjustable by said member for preventing the starter from cutting out resistance in one extreme position of said member and for permitting the starter to operate normally in the other extreme position of said member.

7. In an electric motor controlling apparatus, the combination with resistance for the armature circuit and an automatic starter for cutting resistance out of said circuit, of a device, adjustable at will, for varying the resistance in said circuit, and means controlled by said device for mechanically obstructing the movement of said automatic starter so as to determine the amount of resistance cut out thereby.

8. In a motor controlling apparatus, a resistance for the armature circuit, a device adjustable at will for varying the resistance in said circuit, an automatic starter for cutting out resistance from said circuit comprising contact members movable into and out of engagement with the resistance contacts, and means controlled by said device for moving said members out of engagement with the resistance contacts successively when said device is moved to insert resistance in the armature circuit.

9. In a motor controlling apparatus, a resistance for the armature circuit, an automatic starter for gradually cutting out the resistance, means normally shunting a portion of said resistance and adapted to insert the same at the commencement of the operation of the starter, a manually adjustable member for varying the resistance in said circuit, and means operated by the starter for connecting said member into the armature circuit after the starter has operated.

10. In a motor controlling apparatus, a resistance for the armature circuit, an automatic starter for gradually cutting out the resistance, a normally closed circuit shunting a portion of said resistance, means for opening said shunt circuit after current has been admitted to the armature and before the starter has operated to cut out the resistance, a manually adjustable member for varying the resistance in said circuit, and means operated by the starter for connecting said member into the armature circuit after the starter has operated.

In testimony whereof I have affixed my signature, in presence of two witnesses.

GEORGE H. WHITTINGHAM.

Witnesses:
 ROBERT WATSON,
 C. VAN SANT.